United States Patent
Ochiai et al.

(10) Patent No.: US 7,713,361 B2
(45) Date of Patent: *May 11, 2010

(54) METAL PRODUCT PRODUCING METHOD, METAL PRODUCT, METAL COMPONENT CONNECTING METHOD, AND CONNECTION STRUCTURE

(75) Inventors: Hiroyuki Ochiai, Tokyo (JP); Mitsutoshi Watanabe, Tokyo (JP); Tatsuto Urabe, Tokyo (JP); Akihiro Goto, Tokyo (JP); Masao Akiyoshi, Tokyo (JP)

(73) Assignees: Ishikawajima-Harima Heavy Industries Co., Ltd., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 637 days.

This patent is subject to a terminal disclaimer.

(21) Appl. No.: 10/560,070

(22) PCT Filed: Jun. 11, 2004

(86) PCT No.: PCT/JP2004/008212

§ 371 (c)(1), (2), (4) Date: Nov. 21, 2006

(87) PCT Pub. No.: WO2004/111303

PCT Pub. Date: Dec. 23, 2004

(65) Prior Publication Data

US 2007/0059905 A1   Mar. 15, 2007

(30) Foreign Application Priority Data

Jun. 11, 2003 (JP) ............................. 2003-167025
Jun. 11, 2003 (JP) ............................. 2003-167074

(51) Int. Cl.
*C23C 26/00* (2006.01)
(52) U.S. Cl. .................. 148/525; 427/532; 427/580; 205/118; 205/205
(58) Field of Classification Search .................. None
See application file for complete search history.

(56) References Cited

U.S. PATENT DOCUMENTS

| 4,346,281 | A | * | 8/1982 | Inoue | 219/76.13 |
| 5,071,054 | A | * | 12/1991 | Dzugan et al. | 228/119 |
| 5,097,586 | A | * | 3/1992 | Sawyer | 29/527.6 |
| 6,417,477 | B1 | * | 7/2002 | Brown et al. | 219/76.13 |

FOREIGN PATENT DOCUMENTS

CN   86 1 01207 A   9/1987

(Continued)

OTHER PUBLICATIONS

Database WPI (Week 200359), Thomson Scientific, London, GB, AN 2003-624088 [59], XP002491019, &KR 2003 037459 A, May 14, 2003, abstract, 1 page.

* cited by examiner

*Primary Examiner*—George Wyszomierski
(74) *Attorney, Agent, or Firm*—Oblon, Spivak, McClelland, Maier & Neustadt, L.L.P.

(57) ABSTRACT

A deposition is gradually formed by molding a product main body, removing a defect periphery including a defect generated on a surface to be treated of the product main body by molding so that a recess portion is formed on the surface to be treated of the product main body, employing a molded electrode composed of a molded body molded from a powder of a metal or the molded body processed with a heat treatment, and generating a pulsing electric discharge between the recess portion periphery including the recess portion and the molded electrode in an electrically insulating liquid or gas so that a material of the molded electrode or a reaction substance of the material carries out deposition and such at the recess portion periphery by energy of the electric discharge.

13 Claims, 14 Drawing Sheets

FOREIGN PATENT DOCUMENTS

| | | |
|---|---|---|
| CN | 1272144 A | 11/2000 |
| EP | 1 092 497 A1 | 4/2001 |
| EP | 1 287 936 A1 | 3/2003 |
| JP | 61-17398 | 1/1986 |
| JP | 62-024916 | 2/1987 |
| JP | 62-161493 | 7/1987 |
| JP | 4-309452 | 11/1992 |
| JP | 5-141685 | 6/1993 |
| JP | 06-280044 | 10/1994 |
| JP | 7-75893 | 3/1995 |
| JP | 7-187275 | 7/1995 |
| JP | 8-257841 | 10/1996 |
| JP | 8-300227 | 11/1996 |
| JP | 9-192937 | 7/1997 |
| JP | 11-117705 | 4/1999 |
| JP | 2000-15427 | 1/2000 |
| JP | 2000-71126 | 3/2000 |
| JP | 2000-230996 | 8/2000 |
| JP | 2003-053533 | 2/2003 |
| KR | 20030037459 | 5/2003 |
| SU | 1098740 A * | 6/1984 |

# METAL PRODUCT PRODUCING METHOD, METAL PRODUCT, METAL COMPONENT CONNECTING METHOD, AND CONNECTION STRUCTURE

TECHNICAL FIELD

The present invention relates to a production method of a metal product, a metal product, a connection method of metal components and a connection structure.

BACKGROUND ART

A series of steps for producing a metal product such as a cylinder and a series of steps for joining a pair of metal components respectively having beveling portions respectively include a step of forming a weld deposition.

More specifically, in a case of producing the metal product, first, a product main body is molded by means of casting for example. Then, a defect caused by molding is generated on a surface to be treated of the product main body. Next, a peripheral portion of the defect including the defect is removed by grinding so that a recess portion is formed on the portion to be treated of the product main body. Further, a weld deposition is formed at a recess portion periphery including the recess portion by means of welding.

Moreover, in a case of joining the pair of the metal components, first, a recess portion is defined by a beveling portion of one of the metal components and another beveling portion of the other of the metal components by means of butting the pair of the metal components. Then, a weld deposition is formed at a recess portion periphery including the recess portion by means of welding.

DISCLOSURE OF INVENTION

In the meantime, because the weld deposition is formed by means of welding, in other words, because the weld deposition in an elevated temperature state is in an instant or in a short time formed at the recess portion periphery, the temperature of the recess portion periphery drastically increases. Thereby, thermal deformation at the recess portion periphery becomes great and there are problems that it gives rise to poor quality in production of the metal product or poor quality in joining of the pair of the metal components.

For solving the aforementioned problems, a first feature of the present invention is a method for production of the metal component and provision with a molding step of molding a product main body; a defect removal step of removing a defect periphery including a defect generated on a surface to be treated of the product main body by molding after finishing the molding step so that a recess portion is formed on the surface to be treated of the product main body; and a deposition step of gradually forming a deposition at a recess portion periphery after finishing the defect removal step by employing a molded electrode composed of a molded body molded from a powder of a metal or the molded body processed with a heat treatment, and generating a pulsing electric discharge between the recess portion periphery including the recess portion and the molded electrode in an electrically insulating liquid or gas so that a material of the molded electrode or a reaction substance of the material carries out deposition, diffusion and/or welding at the recess portion periphery by energy of the electric discharge.

A second feature of the present invention is a method for joining a pair of metal components and provision with a butting step of defining a recess portion by a beveling portion of one of the metal components and another beveling portion of the other of the metal components by means of butting the pair of the metal components; and a deposition step of gradually forming a deposition at a recess portion periphery after finishing the butting step by employing a molded electrode composed of a molded body molded from a powder of a metal or the molded body processed with a heat treatment, and generating a pulsing electric discharge between the recess portion periphery including the recess portion and the molded electrode in an electrically insulating liquid or gas so that a material of the molded electrode or a reaction substance of the material carries out deposition, diffusion and/or welding at the recess portion periphery by energy of the electric discharge.

BEST MODE FOR CARRYING OUT THE INVENTION

A description will be hereinafter given to certain embodiments of the present invention for describing the present invention in further detail with appropriate reference to the accompanying drawings. Meanwhile, in the description, in proper, "a cross direction" is referred to as an X-axis direction, "a horizontal direction" is referred to as a Y-axis direction and "a vertical direction" is referred to as a Z-axis direction.

First Embodiment

Figure 1:
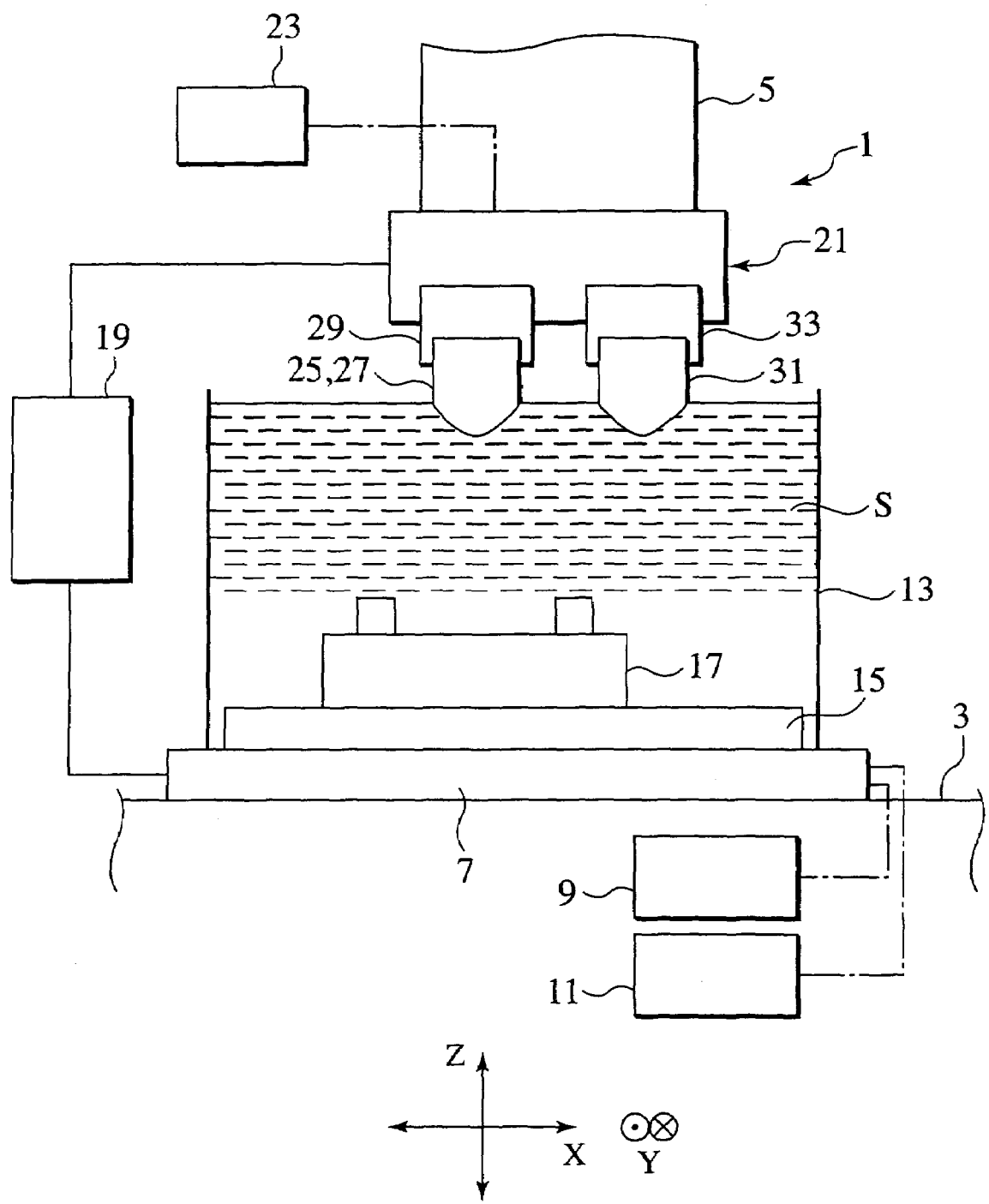
[FIG. 1] A drawing showing an electric spark machine in accordance with a first embnodiment.

An electric spark machine 1 applied to a production method of a metal product in accordance with a first embodiment of the present invention will be described hereinafter with reference to FIG. 1.

The electric spark machine 1 is provided with a bed 3 extending in an X-axis direction and a Y-axis direction and a column 5 extending in an Z-axis. Further, the bed 3 is provided with a table 7 and the table 7 is movable in the X-axis direction by means of a drive of an X-axis servo-motor and movable in the Y-axis direction by means of a drive of a Y-axis servo-motor.

The table 7 is provided with a processing tank 13 for reserving an electrically insulating liquid S such as oil and, in the processing tank 13, a support plate 15 is provided. The support plate 15 is provided with a jig 17 to which a metal product or such described later is capable of being set. Meanwhile, the jig 17 is electrically connected to an electric power source 19 via the support plate 15 and a concrete constitution of the jig 17 is changeable depending on the metal product and such.

The column 5 is provided with a processing head 21 and the processing head 21 is movable in a Z-axis direction by means of a drive of a Z-axis servo-motor. Here, when the table 7 is moved in the X-axis direction by means of the drive of the X-axis servo-motor, the processing head 21 is capable of moving in the X-axis direction relative to the table 7. Moreover, when the table 7 is moved in the Y-axis direction by means of the drive of the Y-axis servo-motor, the processing head 21 is capable of moving in the Y-axis direction relative to the table 7.

Further, the processing head 21 is provided with a first holder 29 for supporting a molded electrode 25 or a molded electrode 27 and, in the vicinity of the first holder 29 in the processing head 21, a second holder 33 for supporting a hard electrode 31 having exhaustion resistance is provided. The first holder 29 and the second holder 33 are electrically connected to the electric power source 19. Moreover, concrete constitutions of the molded electrodes 25, 27 will be described later.

Figure 2:
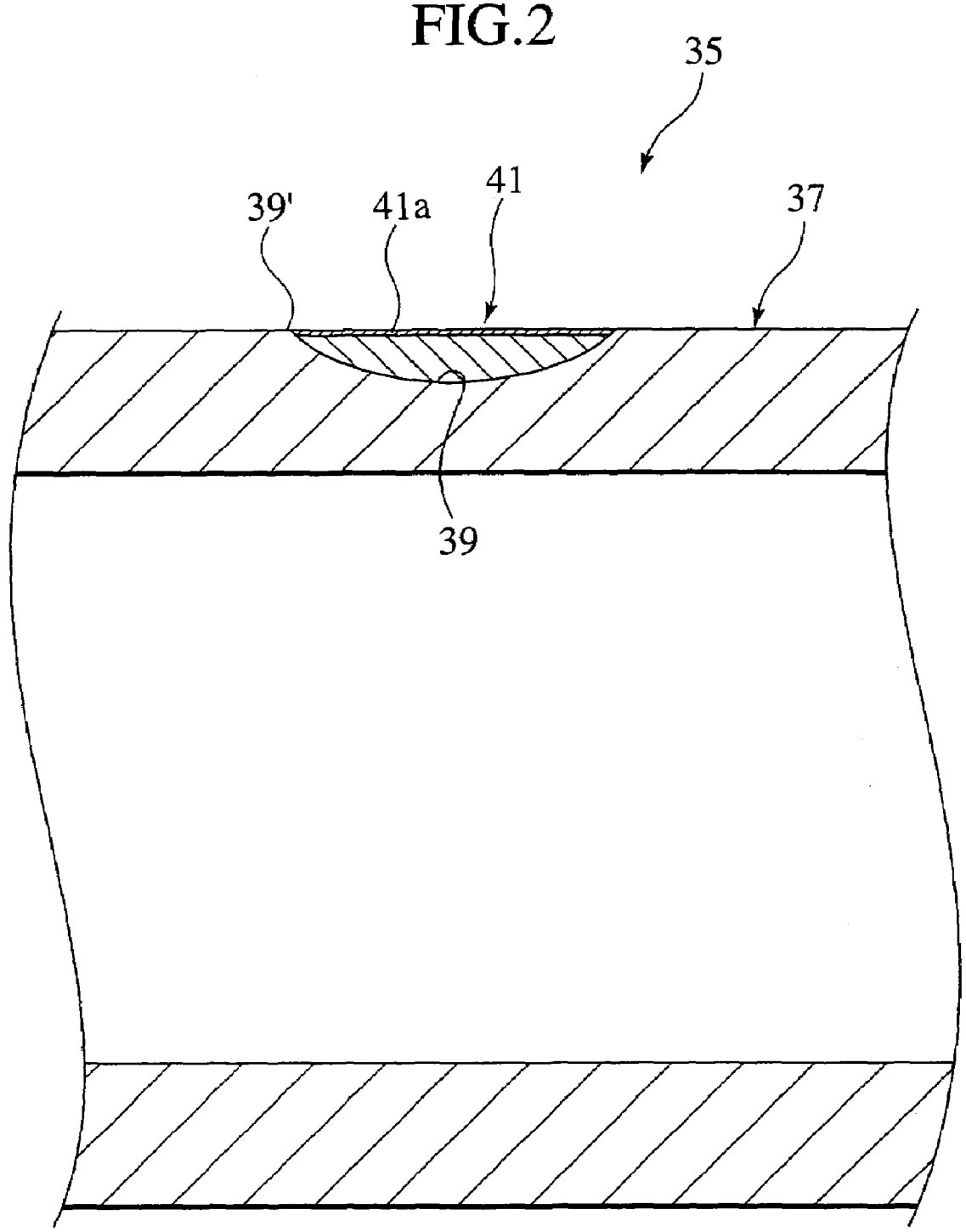
[FIG. 2] A partial cross sectional view of a cylinder in accordance with the first embodiment.

Next, a cylinder 35 as a metal component which is a subject of the production method of the metal product in accordance with the first embodiment will be described hereinafter with reference to FIG. 2.

The cylinder 35 as the metal component in accordance with the first embodiment is one of constituent elements of a gas turbine and provided with a cylinder main body 37 as a product main body. Further, at an outer peripheral surface of the cylinder main body 37, a recess portion 39 is formed by means of energy of an electric discharge and, at a recess portion periphery 39' including the recess portion 39, a deposition 41 is formed by means of energy of an electric discharge. Meanwhile, details of the recess portion 39 and the deposition 41 will be described later.

Next, the production method of the metal product in accordance with the first embodiment will be described hereinafter with reference to from FIG. 1 to FIG. 7.

Figure 7:
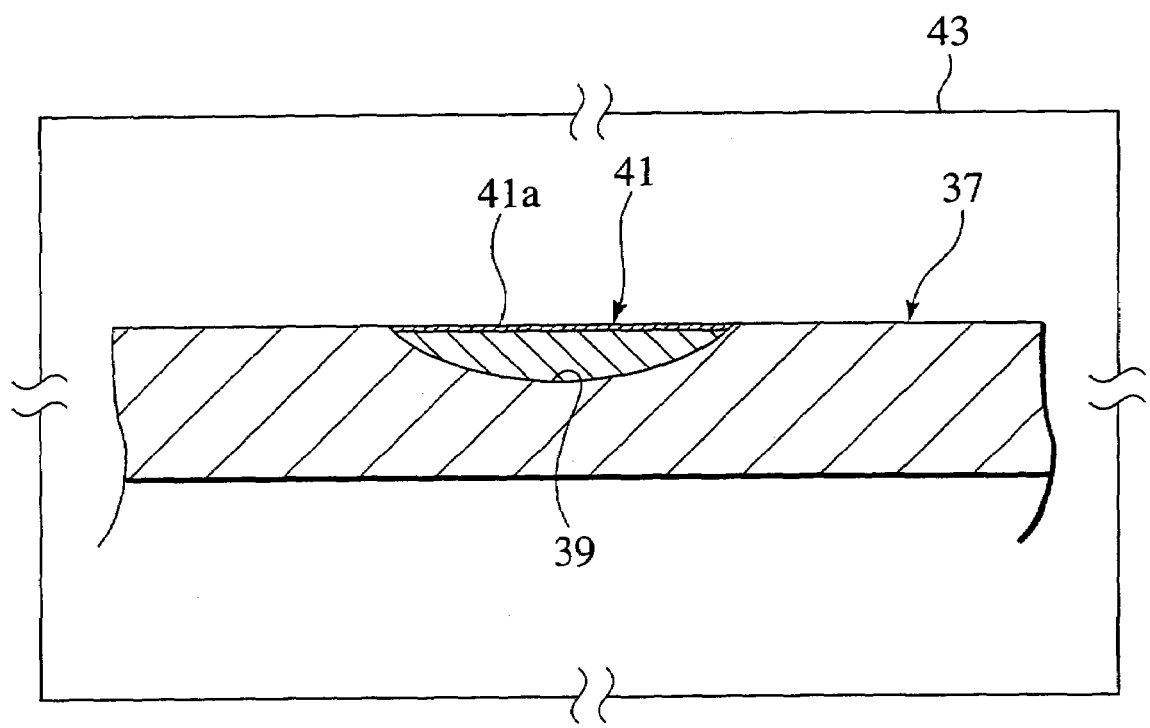
[FIG. 7] A drawing explaining a production method of a metal product in accordance with the first embodiment.

The production method of the metal product in accordance with the first embodiment is a method for producing the cylinder 35 as the metal component and employs the electric spark machine 1, the molded electrode 25, the hard electrode 31 and a heat treatment furnace 43 shown in FIG. 7.

Here, the molded electrode 25 is a molded body molded from powder of a material having the same composition as a base material of the cylinder main body 37, powder of a material having a similar composition to the base material of the cylinder main body 37, or powder of a material having a coefficient of thermal expansion close to a coefficient of thermal expansion of the base material of the cylinder main body 37 by means of compression by pressing; or the molded body subject to a heat treatment by a vacuum furnace or such.

Meanwhile, in a case where the base material of the cylinder 37 is, for example, an alloy of AMS (Aerospace Material Specifications) No. 5662, various nickel alloys become the material having the similar composition and cobalt or cobalt alloys become the material having the coefficient of the thermal expansion close thereto. Meanwhile, instead of molding by compressing, the electrode 25 may be formed by slurry pouring, MIM (Metal Injection Molding), spray forming and such.

Moreover, the hard electrode 31 is composed of a solid substance of graphite, tungsten alloys, or copper alloys.

Further, the production method of the metal product in accordance with the first embodiment is provided with a (1-1) molding step, a (1-2) defect removal step, a (1-3) deposition step, a (1-4) excessive deposition removal step and a (1-5) heat treatment step.

(1-1) Molding Step

Figure 3:
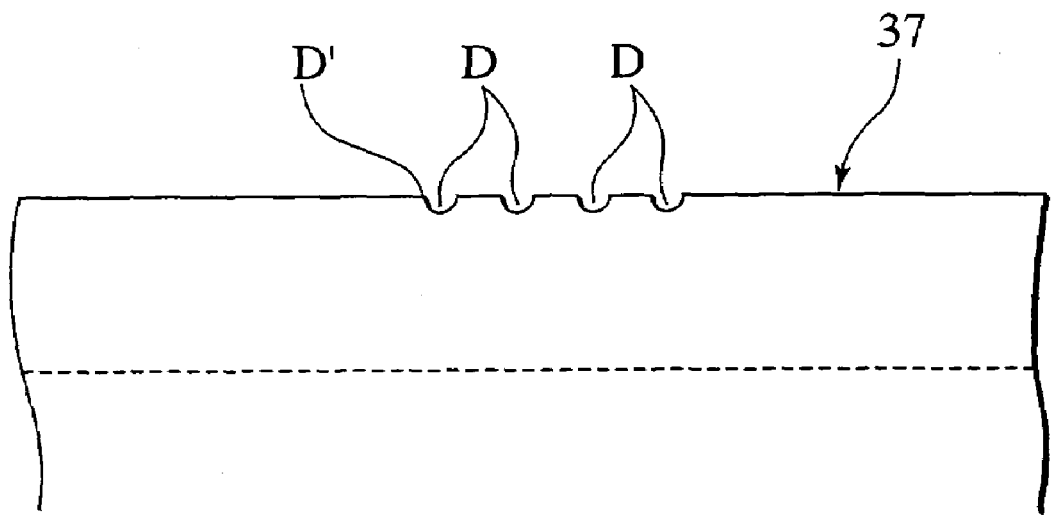
[FIG. 3] A drawing explaining a production method of a metal product in accordance with the first embodiment.

The cylinder main body 37 as the product main body is molded by means of casting by using a not-shown casting mold. Meanwhile, as shown in FIG. 3, casting cavities D caused by molding, as a type of defects, are generated on a peripheral surface of the cylinder main body 37 as a surface to be treated.

(1-2) Defect Removal Step

After finishing the (1-1) molding step, the cylinder main body 37 is set to the jig 17. Next, by means of driving the X-axis servo-motor 9 and the Y-axis servo-motor 11, the table 7 is moved in the X-axis direction and the Y-axis direction to position the cylinder main body 37 so that a casting cavity periphery D' as a defect periphery including the casting cavities D is opposed to the hard electrode 31. Meanwhile, there may be a case where the table 7 is only necessary to be moved in any of the X-axis direction and the Y-axis direction.

Figure 4:
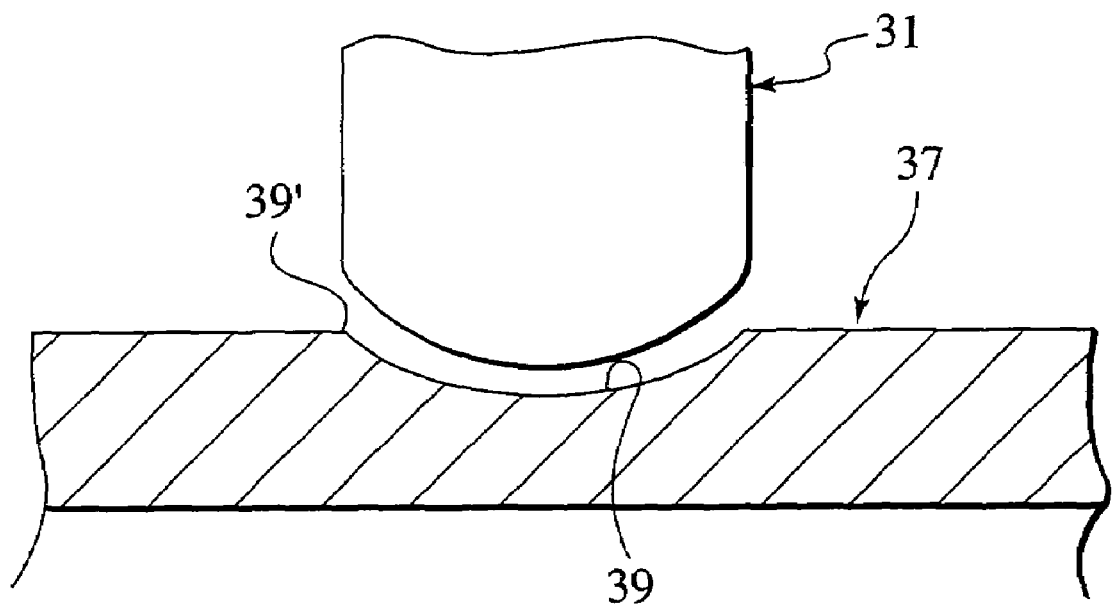
[FIG. 4] A drawing explaining a production method of a metal product in accordance with the first embodiment.

Further, a pulsing electric discharge is generated between the casting cavity periphery D' and the hard electrode 31. Thereby, as shown in FIG. 4, by means of energy of the electric discharge, the casting cavities D are removed and a recess portion 39 can be formed on the peripheral surface of the cylinder main body 37. Meanwhile, when generating the pulsing discharge, the electrode, as being integral with the processing head 21, is reciprocated in the Z-axis direction by a small travel distance by means of a drive of the Z- axis servo-motor 23.

(1-3) Deposition Step

After finishing the (1-2) defect removal step, by means of driving the X-axis servo-motor 9 and the Y-axis servo-motor 11, the table 7 is moved in the X-axis direction and the Y-axis direction to position the cylinder main body 37 so that a recess portion periphery 39' is opposed to the molded electrode 25. Meanwhile, there may be a case where the table 7 is only necessary to be moved in any of the X-axis direction and the Y-axis direction.

Figure 5:
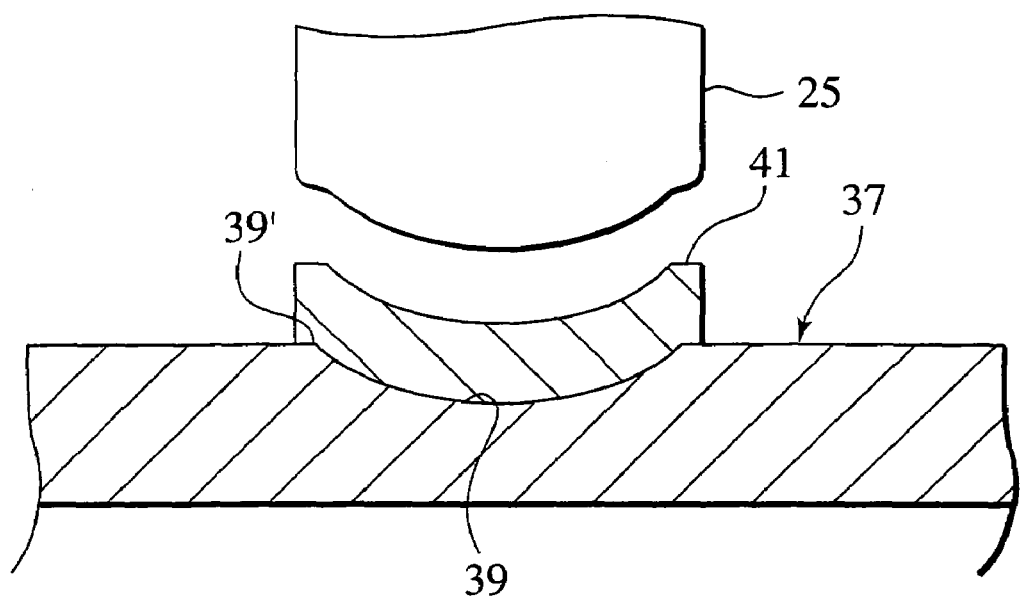
[FIG. 5] A drawing explaining a production method of a metal product in accordance with the first embodiment.

Further, a pulsing electric discharge is generated between the recess portion periphery 39' and the molded electrode 25 in an electrically insulating liquid S. Thereby, as shown in FIG. 5, by means of energy of the electric discharge, a material of the molded electrode 25 or a reaction substance of the material carries out deposition, diffusion and/or welding at the recess portion periphery 39' and thereby a deposition 41 can be gradually formed at the recess portion periphery 39'. Meanwhile, when generating the pulsing discharge, the molded electrode 25, as being integral with the processing head 21, is reciprocated in the Z-axis direction by a small travel distance by means of a drive of the Z-axis servo-motor 23.

Meanwhile, "deposition, diffusion and/or welding" means all meanings including "deposition", "diffusion", "welding", "mixed phenomena of deposition and diffusion", "mixed phenomena of deposition and welding", "mixed phenomena of diffusion and welding" and "mixed phenomena of deposition, diffusion and welding".

Here, dimensions of the deposition 41 are made to be greater than dimensions of the recess portion 39. In concrete terms, an outer periphery of the deposition 41 is made to spread outward in 0.5 mm or more relative to an outer periphery of the recess portion 39 and a thickness of the deposition 41 is made to be thicker in 0.3 mm or more than a thickness required to filling the recess portion 39. Thereby diffusion bonding among particles at the interior of the deposition 41 can be generated.

Meanwhile, a part of the deposition 41 becomes an excessive deposition 41f sticking out of the recess portion 39.

(1-4) Excessive Deposition Removal Step

After finishing the (1-3) deposition step, by means of driving the X-axis servo-motor 9 and the Y-axis servo-motor 11, the table 7 is moved in the X-axis direction and the Y-axis direction to position the cylinder main body 37 so that the deposition 41 is opposed to the hard electrode 31. Meanwhile, there may be a case where the table 7 is only necessary to be moved in any of the X-axis direction and the Y-axis direction.

Figure 6:
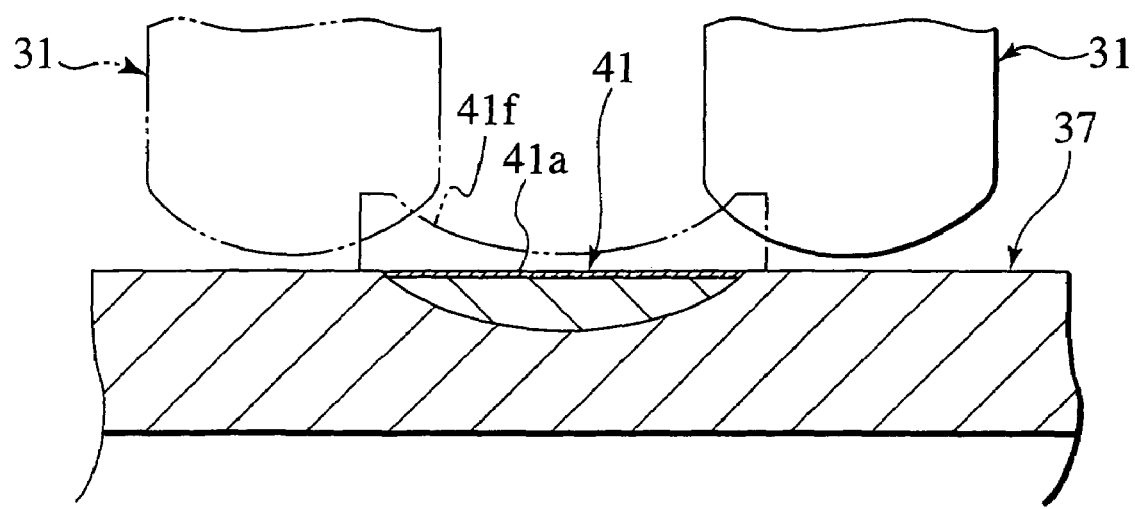
[FIG. 6] A drawing explaining a production method of a metal product in accordance with the first embodiment.

Further, a pulsing electric discharge is generated between the deposition 41 and the hard electrode 31 in an electrically insulating liquid S. Thereby, as shown in FIG. 6, by means of energy of the electric discharge, a thin film 41a composed of a structure of high density can be generated as well as the excessive deposition 41f can be removed. Meanwhile, when generating the pulsing discharge, the hard electrode 31 is moved in the X-axis direction relative to the cylinder main body 37 and the hard electrode 31, as being integral with the processing head 21, is reciprocated in the Z-axis direction by a small travel distance by means of a drive of the Z-axis servo-motor 23.

(1-5) Heat Treatment Step

After finishing the (1-4) excessive deposition removal step, the cylinder main body 37 is removed from the jig 17 and set at a predetermined position of the heat treatment furnace 43. Further, as shown in FIG. 7, the deposition 41 accompanying the cylinder main body 37 is kept at a high temperature in a vacuum or in the air by means of the heat treatment furnace 43. Thereby, a heat treatment can be processed with respect to the deposition 41 so as to progress diffusion bonding among the particles at the interior of the deposition 41 and the production of the cylinder 35 as the metal product is finished.

Here, the temperature and the period of time are 20 minutes at a high temperature of 1050 degrees C. and subsequently 4 hours at a high temperature of 760 degrees C. in a case where the deposition 41 is composed of a nickel alloy or a cobalt alloy.

Meanwhile, the production method of the metal product in accordance with the aforementioned first embodiment may be modified as in the following embodiment.

More specifically, the (1-4) excessive deposition removal step or the (1-5) heat treatment step can be omitted from the series of the steps in the production method of the metal production in accordance with the first embodiment or step orders of the (1-4) excessive deposition removal step and the (1-5) heat treatment step can be interchanged.

Moreover, instead of generating the pulsing discharge in the electrically insulating liquid S, a pulsing discharge may be generated in an electrically insulating gas.

Furthermore, by using a grinding lathe instead of the electric spark machine 1, the casting cavity periphery D' may be removed or the excessive deposition 41f may be removed.

Moreover, instead of removing the casting cavity periphery D', any defect periphery including defects such as cracks may be removed.

Next, operations of the first embodiment will be described.

Because energy of the electric discharge locally acts on a prominently small part and the deposition 41 is gradually formed by carrying out deposition, diffusion and/or welding of the material of the molded electrode 25 or such, a temperature of the recess portion periphery 39' in the cylinder main body 37 is prevented from rapidly increasing at a time of producing the cylinder 35.

Moreover, because the deposition 41 is formed by means of the energy of the electric discharge, a boundary part between the deposition 41 and a base material of the cylinder main body 37 has a structure in which a composition ratio grades and hence the deposition 41 can be firmly combined with the cylinder main body 37.

Furthermore, because the diffusion bonding among the particles at the interior of the deposition 41 progresses, a tensile strength of the deposition 41 can be increased.

Moreover, because the dimensions of the deposition 41 formed at the (1-3) deposition step are made to be greater than the dimensions of the recess portion 39, a porous structure is not left in a surface side of the deposition 41 after the (1-4) deposition step.

In accordance with the first embodiment as described above, because the temperature of the recess portion periphery 39' in the cylinder main body 37 is prevented from rapidly increasing at the time of producing the cylinder 35, thermal deformation of the recess portion periphery 39' is sufficiently suppressed and hence defective production of the cylinder 35 is reduced to be almost none.

Moreover, because the deposition 41 can be firmly combined with the cylinder main body 37, the deposition 41 becomes unsusceptible to peeling off from the base material of the cylinder main body 37 and hence quality of the cylinder 35 can be stabilized.

Furthermore, because the tensile strength of the deposition 41 can be increased, a mechanical strength of the recess portion periphery 39' in the cylinder main body 37 can be increased.

Moreover, because the deposition 41 has the thin film 41a composed of the structure of high density, permeation of fluid out of the interior of the cylinder 35 can be suppressed.

Second Embodiment

Figure 8:
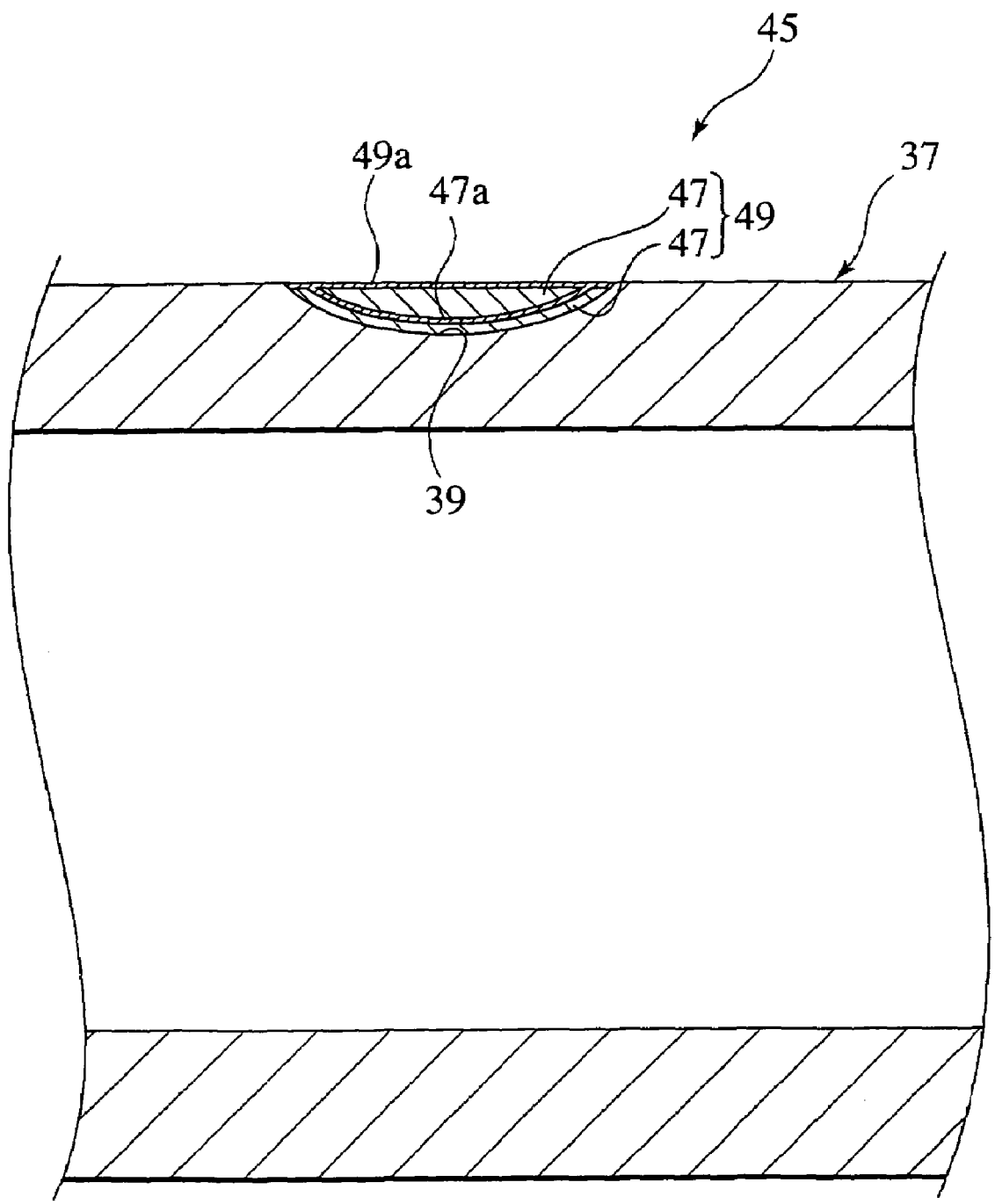
[FIG. 8] A partial cross sectional view of a cylinder in accordance with a second embodiment.

A cylinder 45 as a metal component which is a subject of a production method of a metal product in accordance with a second embodiment will be briefly described hereinafter with reference to FIG. 8.

The cylinder 45 as the metal component in accordance with the second embodiment is, as similar to the cylinder 35 in accordance with the first embodiment, provided with a cylinder main body 37 as a product main body and, at an outer peripheral surface of the cylinder main body 37, a recess portion 39 is formed by means of energy of an electric discharge. Further, at a recess portion periphery 39' including the recess portion 39, a deposition group 49 constituted of two layers of depositions 47 is formed by means of energy of an electric discharge. Meanwhile, details of the deposition group 49 will be described later.

Next, the production method of the metal product in accordance with the second embodiment will be described hereinafter with reference to FIG. 1, FIG. 3, FIG. 4 and from FIG. 9 to FIG. 13.

The production method of the metal product in accordance with the second embodiment is a method for producing the cylinder 45 as the metal component and employs the electric spark machine 1, the molded electrode 25, the hard electrode 31 and the heat treatment furnace 43 as described above.

Further, the production method of the metal product in accordance with the second embodiment is provided with a (2-1) molding step, a (2-2) defect removal step, a first deposition step, a (2-4) thin film step, a (2-5) second deposition step, a (2-6) excessive deposition removal step and a (2-7) heat treatment step.

(2-1) Molding Step

This step is carried out in the same manner as the aforementioned (1-1) molding step. (see FIG. 3)

(2-2) Defect Removal Step

This step is carried out in the same manner as the aforementioned (1-2) defect removal step. (see FIG. 4)

(2-3) First Deposition Step

After finishing the (2-2) defect removal step, by means of driving the X-axis servo-motor 9 and the Y-axis servo-motor 11, the table 7 is moved in the X-axis direction and the Y-axis direction to position the cylinder main body 37 so that the recess portion periphery 39' is opposed to the molded electrode 25. Meanwhile, there may be a case where the table 7 is only necessary to be moved in any of the X-axis direction and the Y-axis direction.

Figure 9:
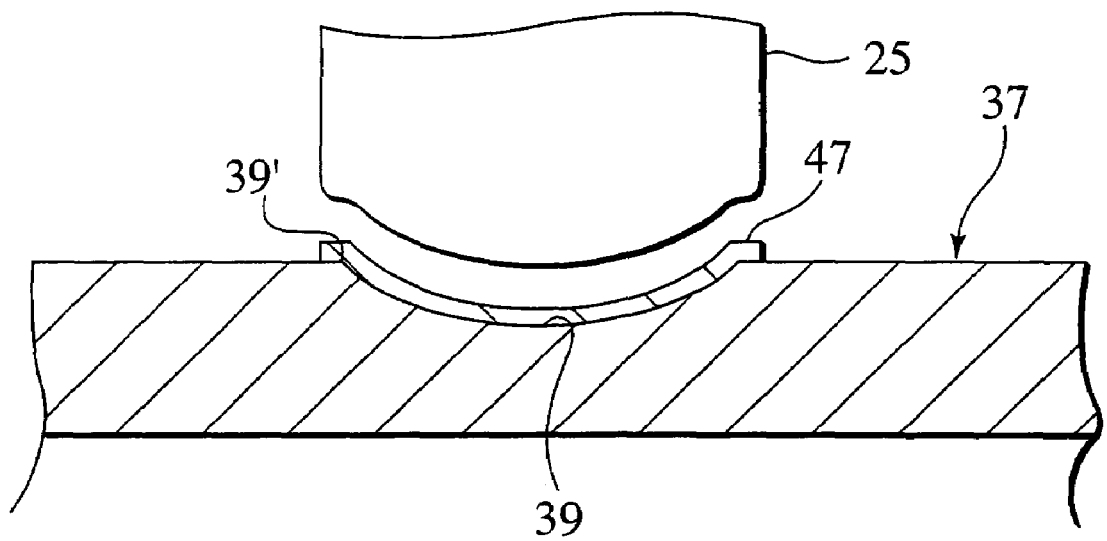
[FIG. 9] A drawing explaining a production method of a metal product in accordance with the second embodiment.

Further, a pulsing electric discharge is generated between the recess portion periphery 39' and the molded electrode 25 in an electrically insulating liquid S. Thereby, as shown in FIG. 9, by means of energy of the electric discharge, a material of the molded electrode 25 or a reaction substance of the material carries out deposition, diffusion and/or welding at the recess portion periphery 39' and thereby the deposition 47 can be gradually formed at the recess portion periphery 39'. Meanwhile, when generating the pulsing discharge, the molded electrode 25, as being integral with the processing head 21, is reciprocated in the Z-axis direction by a small travel distance by means of a drive of the Z-axis servo-motor 23.

(2-4) Thin Film Step

After finishing the (2-3) first deposition step, by means of driving the X-axis servo-motor 9 and the Y-axis servo-motor 11, the table 7 is moved in the X-axis direction and the Y-axis direction to position the cylinder main body 37 so that the deposition 47 is opposed to the hard electrode 31. Meanwhile, there may be a case where the table 7 is only necessary to be moved in any of the X-axis direction and the Y-axis direction.

Figure 10:
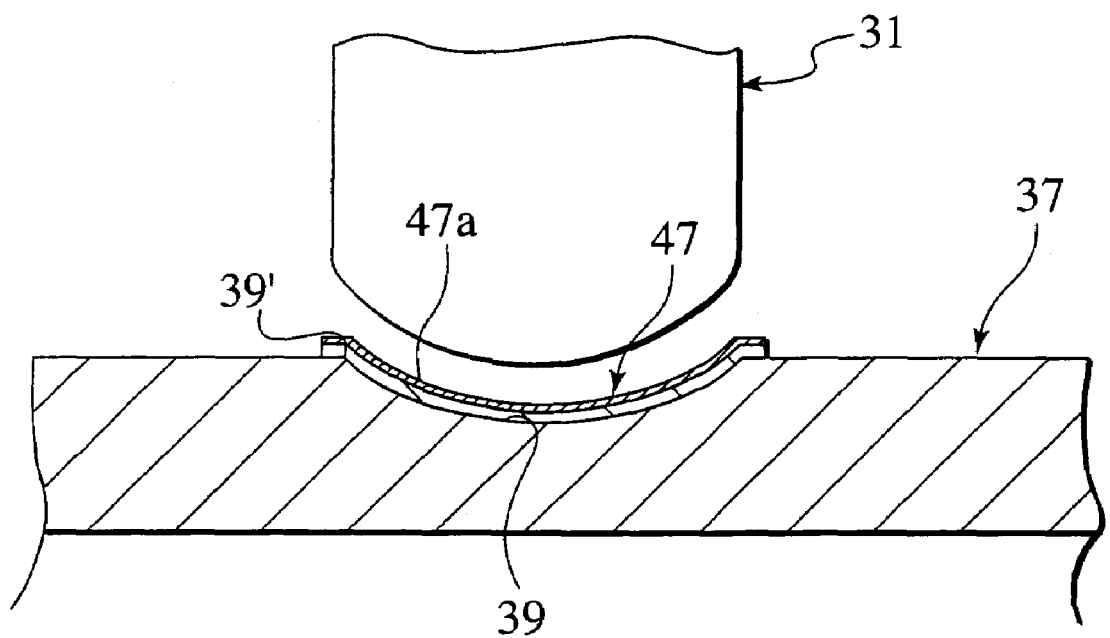
[FIG. 10] A drawing explaining a production method of a metal product in accordance with the second embodiment.

Further, a pulsing electric discharge is generated between the deposition 47 and the hard electrode 31 in an electrically insulating liquid S. Thereby, as shown in FIG. 10, a surface of the deposition is melted by means of energy of the electric discharge and a thin film 47a composed of a structure of high density can be generated on the surface of the deposition 47. Meanwhile, when generating the pulsing discharge, the hard electrode 31, as being integral with the processing head 21, is reciprocated in the Z-axis direction by a small travel distance by means of a drive of the Z-axis servo-motor 23.

(2-5) Second Deposition Step

Figure 11:
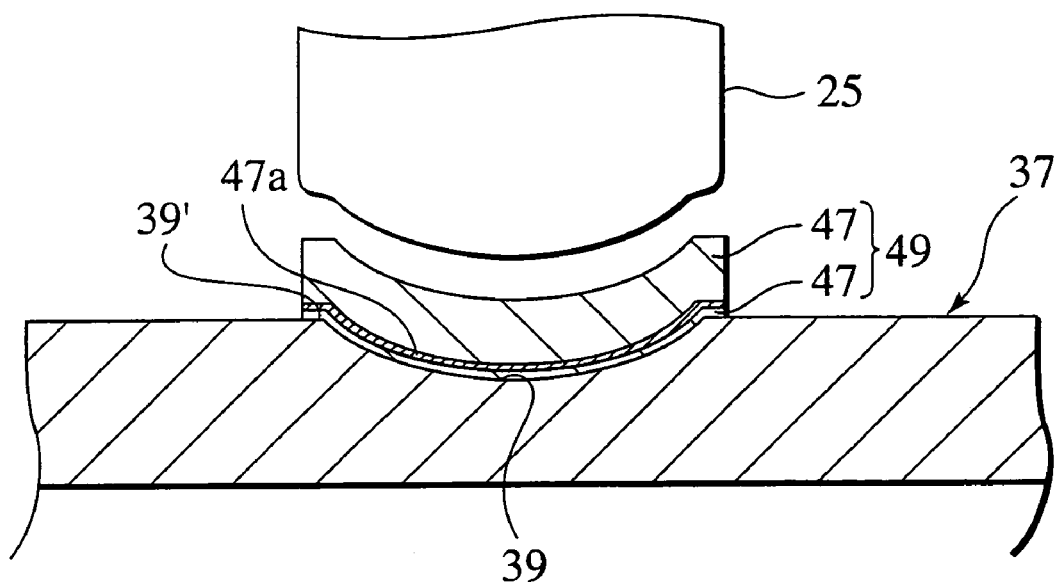
[FIG. 11] A drawing explaining a production method of a metal product in accordance with the second embodiment.

After finishing the (2-4) thin film step, by means of driving the X-axis servo-motor 9 and the Y-axis servo-motor 11, the table 7 is moved in the X-axis direction and the Y-axis direction to position the cylinder main body 37 so that the thin film 47a in the deposition 47 is opposed to the molded electrode 25. Meanwhile, there may be a case where Further, a pulsing electric discharge is generated between the thin film 47a in the deposition 47 and the molded electrode 25 in an electrically insulating liquid S. Thereby, as shown in FIG. 11, by means of energy of the electric discharge, a material of the molded electrode 25 or a reaction substance of the material carries out deposition, diffusion and/or welding at the thin film 47a in the deposition 47 and thereby a deposition group 49 constituted of two layers of the depositions 47 can be gradually formed at the recess portion 39. Meanwhile, when generating the pulsing discharge, the molded electrode 25, as being integral with the processing head 21, is reciprocated in the Z-axis direction by a small travel distance by means of a drive of the Z-axis servo-motor 23.

Here, dimensions of the deposition group 49 formed at the (2-5) second deposition step are made to be greater than dimensions of the recess portion 39. In concrete terms, an outer periphery of the deposition group 49 is made to spread outward in 0.5 mm or more relative to an outer periphery of the recess portion 39 and a thickness of the deposition group 49 is made to be thicker in 0.3 mm or more than a thickness required to filling the recess portion 39. Meanwhile, a part of the deposition group 49 becomes an excessive deposition 49f sticking out of the recess portion 39. Thereby diffusion bonding among particles at the interior of the deposition group 49 can be generated.

(2-6) Excessive Deposition Removal Step

After finishing the (2-5) second deposition step, by means of driving the X-axis servo-motor 9 and the Y-axis servo-motor 11, the table 7 is moved in the X-axis direction and the Y-axis direction to position the cylinder main body 37 so that the deposition group 49 is opposed to the hard electrode 31. Meanwhile, there may be a case where the table 7 is only necessary to be moved in any of the X-axis direction and the Y-axis direction.

Figure 12:
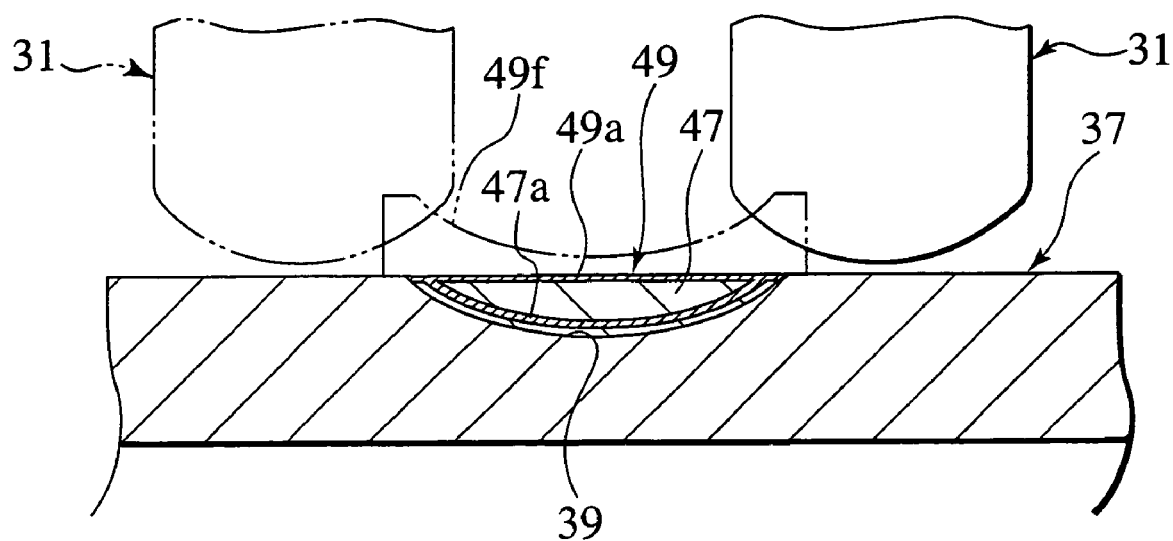
[FIG. 12] A drawing explaining a production method of a metal product in accordance with the second embodiment.

Further, a pulsing electric discharge is generated between the deposition group 49 and the hard electrode 31 in an electrically insulating liquid S. Thereby, as shown in FIG. 12, by means of energy of the electric discharge, a thin film 49a composed of a structure of high density can be generated as well as the excessive deposition 49f can be removed. Meanwhile, when generating the pulsing discharge, the hard electrode 31 is moved in the X-axis direction relative to the cylinder main body 37 and the hard electrode 31, as being integral with the processing head 21, is reciprocated in the Z-axis direction by a small travel distance by means of a drive of the Z-axis servo-motor 23.

(2-7) Heat Treatment Step

After finishing the (2-6) excessive deposition removal step, the cylinder main body 37 is removed from the jig 17 and set at a predetermined position of the heat treatment furnace 43.

Figure 13:
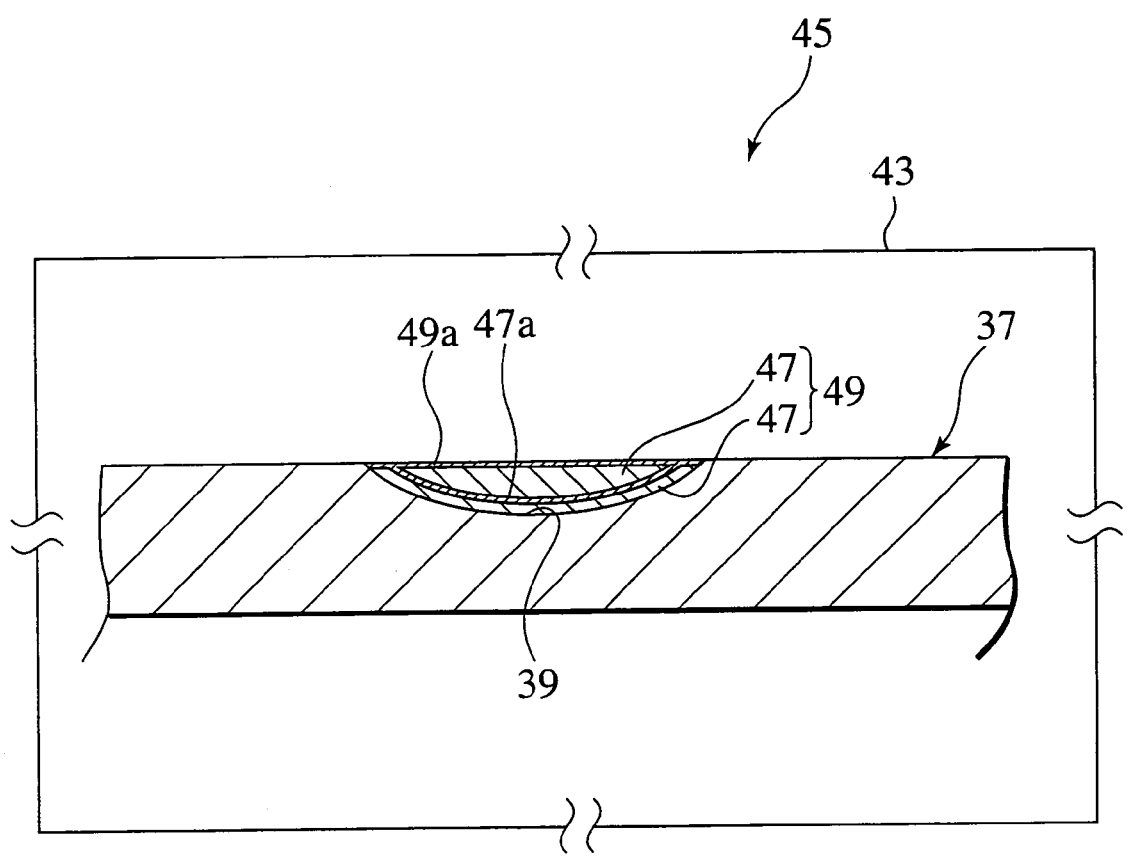
[FIG. 13] A drawing explaining a production method of a metal product in accordance with the second embodiment.

Further, as shown in FIG. 13, the deposition group 49 accompanying the cylinder main body 37 is kept at a high temperature in a vacuum or in the air by means of the heat treatment furnace 43. Thereby, a heat treatment can be processed with respect to the deposition group 49 so as to progress diffusion bonding among the particles at the interior of the deposition group 49 and the production of the cylinder 45 as the metal product is finished.

Here, the temperature and the period of time are 20 minutes at a high temperature of 1050 degrees C. and subsequently 4 hours at a high temperature of 760 degrees C. in a case where the deposition group 49 is composed of a nickel alloy or a cobalt alloy.

Meanwhile, the production method of the metal product in accordance with the aforementioned first embodiment may be modified as in the following embodiment.

More specifically, the (2-6) excessive deposition removal step or the (2-7) heat treatment step can be omitted from the series of the steps in the production method of the metal production in accordance with the second embodiment or step orders of the (2-6) excessive deposition removal step and the (2-7) heat treatment step can be interchanged.

Moreover, instead of generating the pulsing discharge in the electrically insulating liquid S, a pulsing discharge may be generated in an electrically insulating gas.

Furthermore, by using a grinding lathe instead of the electric spark machine 1, the casing cavity periphery D' may be removed or the excessive 49f may be removed.

Moreover, instead of removing the casting cavity periphery D', any defect periphery including defects such as cracks may be removed.

Next, operations of the second embodiment will be described.

Because energy of the electric discharge locally acts on a prominently small part and the deposition group 49 is gradually formed by carrying out deposition, diffusion and/or welding of the material of the molded electrode 25 or such, a temperature of the recess portion periphery 39' in the cylinder main body 37 is prevented from rapidly increasing at a time of producing the cylinder 45.

Moreover, because the deposition group 49 is formed by means of the energy of the electric discharge, a boundary part between the deposition group 49 and a base material of the cylinder main body 37 has a structure in which a composition ratio grades and hence the deposition group 49 can be firmly combined with the cylinder main body 37.

Furthermore, because the diffusion boding among the particles at the interior of the deposition group 49 progresses, a tensile strength of the deposition group 49 can be increased.

In accordance with the second embodiment as described above, because the temperature of the recess portion periphery 39' in the cylinder main body 37 is prevented from rapidly increasing at the time of producing the cylinder 45, thermal deformation of the recess portion periphery 39' is sufficiently suppressed and hence defective production of the cylinder 45 is reduced to be almost none.

Moreover, because the deposition group 49 can be firmly combined with the cylinder main body 37, the deposition group 49 becomes unsusceptible to peeling off from the base material of the cylinder main body 37 and hence quality of the cylinder 45 can be stabilized.

Furthermore, because the tensile strength of the deposition group 49 can be increased, a mechanical strength of the recess portion periphery 39' in the cylinder main body 37 can be increased.

Moreover, because the deposition group 49 has the thin films 47a, 49a composed of the structures of high density, permeation of fluid out of the interior of the cylinder 45 can be suppressed.

Third Embodiment

Figure 14:
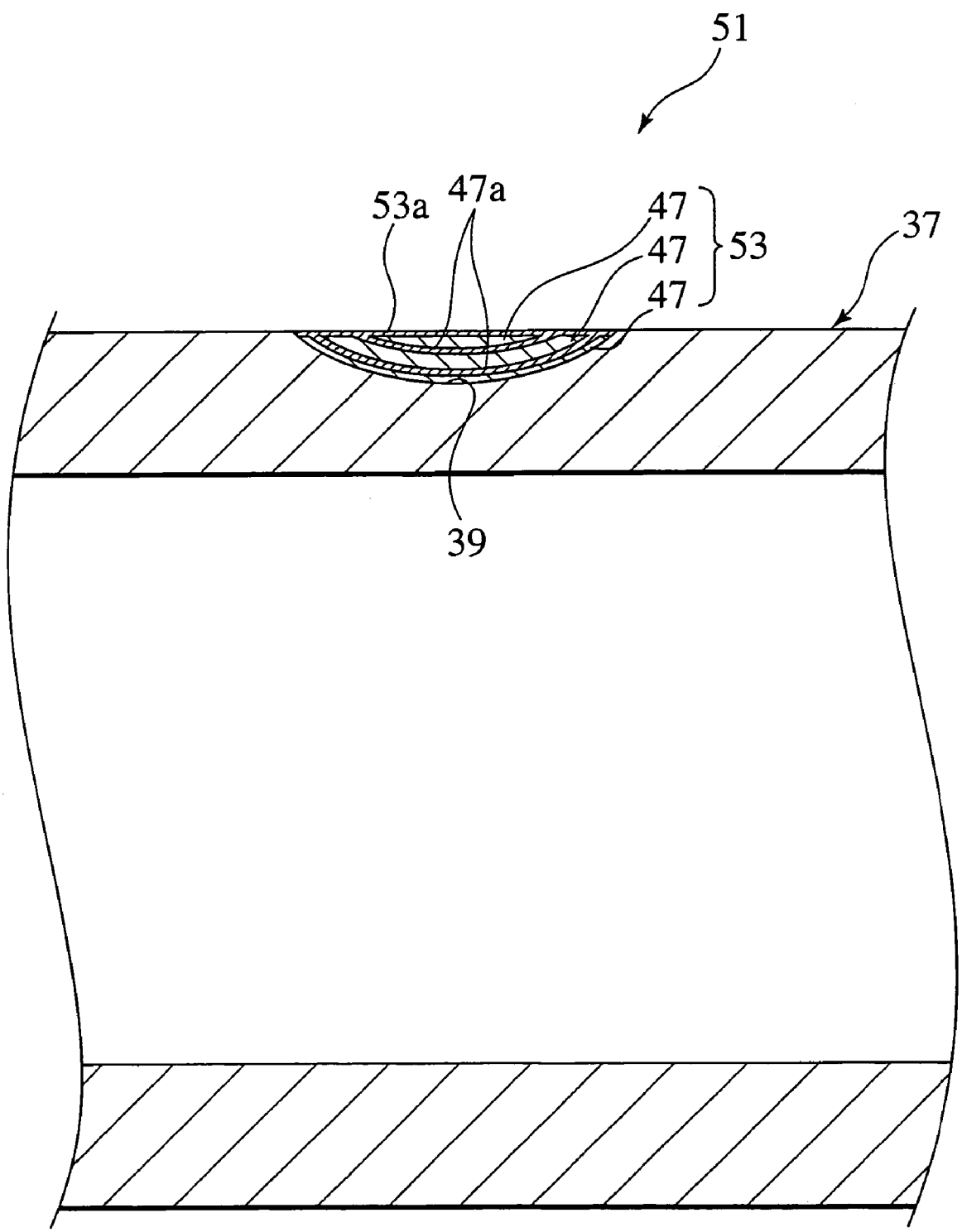
[FIG. 14] A partial cross sectional view of a cylinder in accordance with a third embodiment.

A cylinder 51 as a metal component which is a subject of a production method of a metal product in accordance with a third embodiment will be briefly described hereinafter with reference to FIG. 14.

The cylinder 51 as the metal component in accordance with the second embodiment is, as similar to the cylinder 35 in accordance with the first embodiment and the cylinder 45 in accordance with the second embodiment, provided with a cylinder main body 37 as a product main body and, at an outer peripheral surface of the cylinder main body 37, a recess portion 39 is formed by means of energy of an electric discharge. Further, at a recess portion periphery 39' including the recess portion 39, a deposition group 53 constituted of plural layers of depositions 47 is formed by means of energy of an electric discharge. Meanwhile, details of the deposition group 53 will be described later.

Figure 15:
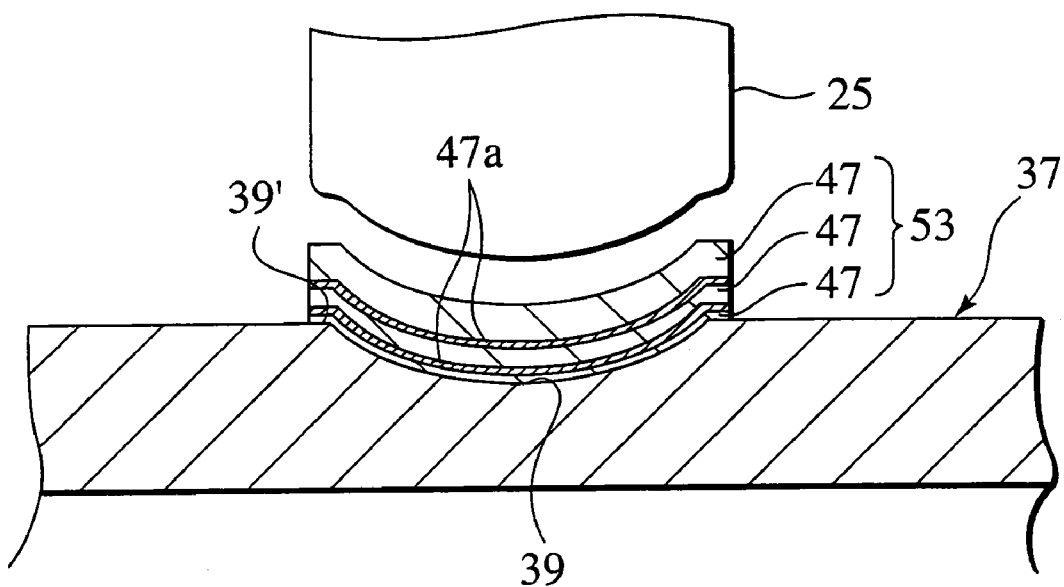
[FIG. 15] A drawing explaining a production method of a metal product in accordance with the third embodiment.
Figure 16:
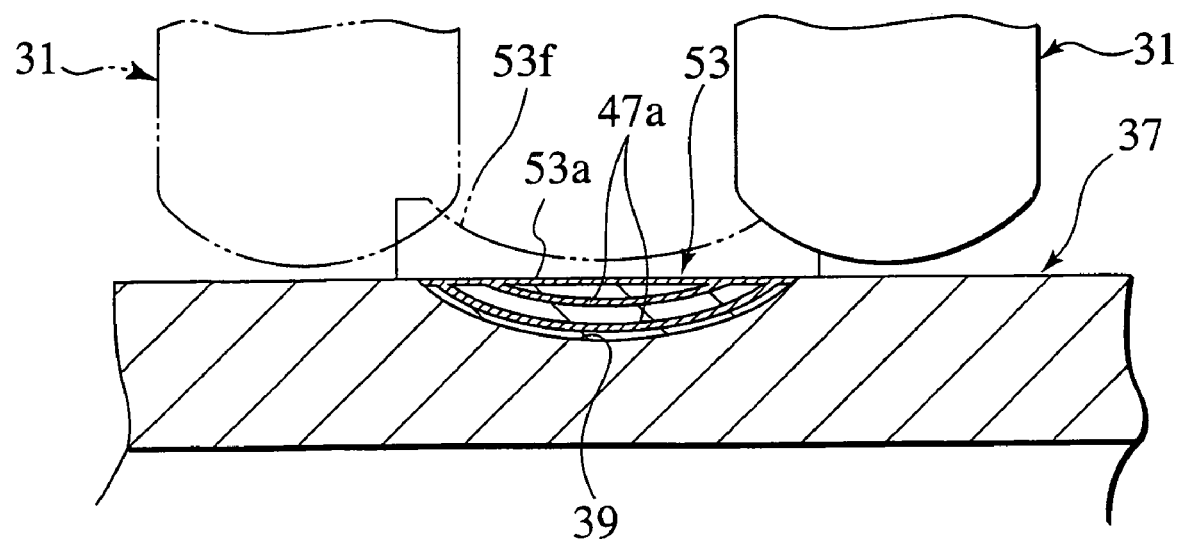
[FIG. 16] A drawing explaining a production method of a metal product in accordance with the third embodiment.
Figure 17:
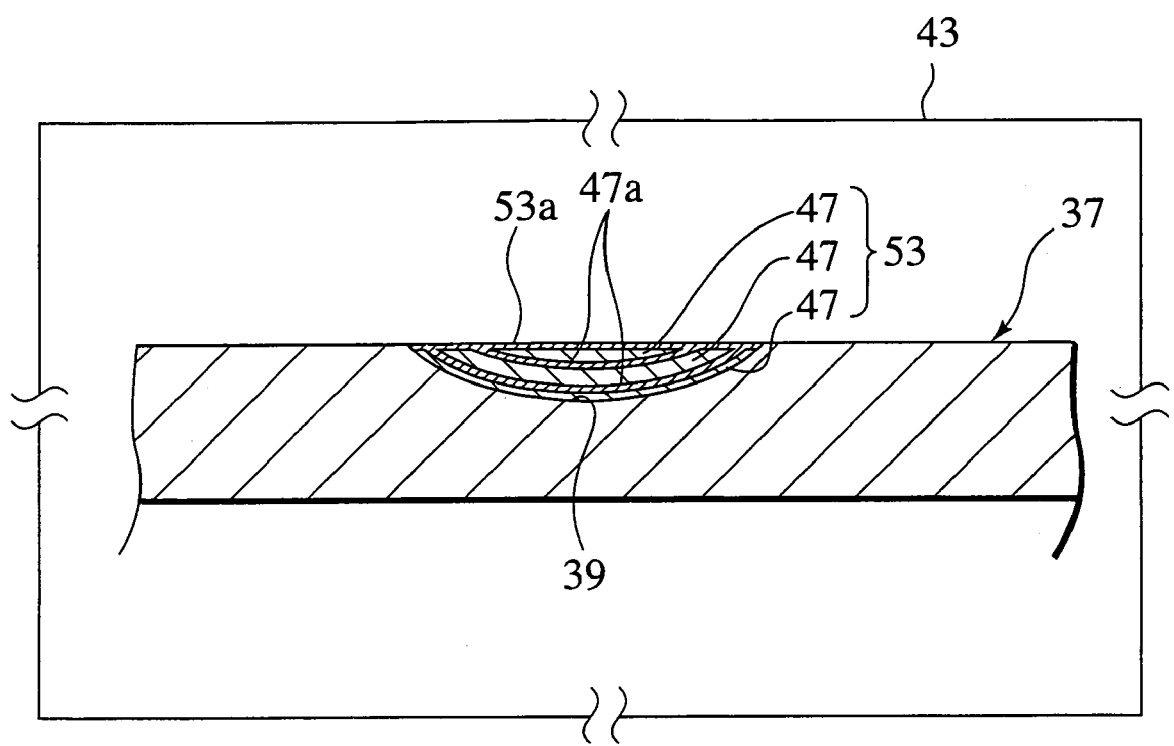
[FIG. 17] A drawing explaining a production method of a metal product in accordance with the third embodiment.

Next, the production method of the metal product in accordance with the third embodiment will be described hereinafter with reference to FIG. 1, FIG. 3, FIG. 4, FIG. 9, FIG. 10 and from FIG. 15 to FIG. 17.

The production method of the metal product in accordance with the third embodiment is a method for producing the cylinder 51 as the metal component and employs the electric spark machine 1, the molded electrode 25, the hard electrode 31 and the heat treatment furnace 43 as described above.

Further, the production method of the metal product in accordance with the third embodiment is provided with a (3-1) molding step, a (3-2) defect removal step, a (3-3) deposition step, a (3-4) thin film step, a (3-5) repetition step, an (3-6) excessive deposition removal step and a (3-7) heat treatment step.

(3-1) Molding Step

This step is carried out in the same manner as the aforementioned (1-1) molding step. (see FIG. 3)

(3-2) Defect Removal Step

This step is carried out in the same manner as the aforementioned (1-2) defect removal step. (see FIG. 4)

(3-3) Deposition Step

This step is carried out in the same manner as the aforementioned (2-3) first deposition step. (see FIG. 9)

(3-4) Thin Film Step

This step is carried out in the same manner as the aforementioned (2-4) thin film step. (see FIG. 10)

(3-5) Repetition Step

After finishing the (3-4) thin film step, the (3-3) deposition step and the (3-4) thin film step are alternately repeated. Thereby, as shown in FIG. 15, thin films 47a are generated on the surfaces of the respective layers of the depositions 47 and the deposition group 53 composed of the plural layers of the depositions 47 can be formed at the recess portion 39 by means of energy of the electric discharge.

Here, dimensions of the deposition group 53 formed at the (3-5) repetition step are made to be greater than dimensions of the recess portion 39. In concrete terms, an outer periphery of the deposition group 53 is made to spread outward in 0.5 mm or more relative to an outer periphery of the recess portion 39 and a thickness of the deposition group 53 is made to be thicker in 0.3 mm or more than a thickness required to filling the recess portion 39. Thereby diffusion bonding among particles at the interior of the deposition group 53 can be generated.

Meanwhile, a part of the deposition group 53 becomes an excessive deposition 53f sticking out of the recess portion 39. Thereby diffusion bonding among particles at the interior of the deposition group 53 can be generated.

(3-6) Excessive Deposition Removal Step

After finishing the (3-5) repetition step, by means of driving the X-axis servo-motor 9 and the Y-axis servo-motor 11, the table 7 is moved in the X-axis direction and the Y-axis direction to position the cylinder main body 37 so that the deposition group 53 is opposed to the hard electrode 31. Meanwhile, there may be a case where the table 7 is only necessary to be moved in any of the X-axis direction and the Y-axis direction.

Further, a pulsing electric discharge is generated between the deposition group 53 and the hard electrode 31 in an electrically insulating liquid S. Thereby, as shown in FIG. 16, by means of energy of the electric discharge, a thin film 53a composed of a structure of high density can be generated as well as the excessive deposition 53f can be removed. Meanwhile, when generating the pulsing discharge, the hard electrode 31 is moved in the X-axis direction relative to the cylinder main body 37 and the hard electrode 31, as being integral with the processing head 21, is reciprocated in the Z-axis direction by a small travel distance by means of a drive of the Z-axis servo-motor 23.

(3-7) Heat Treatment Step

After finishing the (3-5) excessive deposition removal step, the cylinder main body 37 is removed from the jig 17 and set at a predetermined position of the heat treatment furnace 43. Further, as shown in FIG. 17, the deposition group 53 accompanying the cylinder main body 37 is kept at a high temperature in a vacuum or in the air by means of the heat treatment furnace 43. Thereby, a heat treatment can be processed with respect to the deposition group 53 50 as to progress diffusion bonding among the particles at the interior of the deposition group 53 and the production of the cylinder 51 as the metal product is finished.

Here, the temperature and the period of time are 20 minutes at a high temperature of 1050 degrees C. and subsequently 4 hours at a high temperature of 760 degrees C. in a case where the deposition group 53 is composed of a nickel alloy or a cobalt alloy.

Meanwhile, the production method of the metal product in accordance with the aforementioned third embodiment may be modified as in the following embodiment.

More specifically, the (3-6) excessive deposition removal step or the (3-7) heat treatment step can be omitted from the series of the steps in the production method of the metal production in accordance with the second embodiment or steps orders of the (3-6) excessive deposition removal step and the (3-7) heat treatment step can be interchanged.

Moreover, instead of generating the pulsing discharge in the electrically insulating liquid S, a pulsing discharge may be generated in an electrically insulating gas.

Furthermore, by using a grinding lathe instead of the electric spark machine 1, the casing cavity periphery D' may be removed or the excessive 53f may be removed.

Moreover, instead of removing the casting cavity periphery D', any defect periphery including defects such as cracks may be removed.

Next, operations of the third embodiment will be described.

Because energy of the electric discharge locally acts on a prominently small part and the deposition group 53 is gradually formed by carrying out deposition, diffusion and/or welding of the material of the molded electrode 25 or such, a temperature of the recess portion periphery 39' in the cylinder main body 37 is prevented from rapidly increasing at a time of producing the cylinder 51.

Moreover, because the deposition group 53 is formed by means of the energy of the electric discharge, a boundary part between the deposition group 53 and a base material of the cylinder main body 37 has a structure in which a composition ratio grades and hence the deposition group 53 can be firmly combined with the cylinder main body 37.

Furthermore, because the diffusion boding among the particles at the interior of the deposition group 53 progresses, a tensile strength of the deposition group 53 can be increased.

In accordance with the third embodiment as described above, because the temperature of the recess portion periphery 39' in the cylinder main body 37 is prevented from rapidly increasing at the time of producing the cylinder 51, thermal deformation of the recess portion periphery 39' is sufficiently suppressed and hence defective production of the cylinder 51 is reduced to be almost none.

Moreover, because the deposition group 53 can be firmly combined with the cylinder main body 37, the deposition group 53 becomes unsusceptible to peeling off from the base material of the cylinder main body 37 and hence quality of the cylinder 51 can be stabilized.

Furthermore, because the tensile strength of the deposition group 53 can be increased, a mechanical strength of the recess portion periphery 39' in the cylinder main body 37 can be increased.

Moreover, because the deposition group 53 has the thin films 47a, 53a composed of the structures of high density, permeation of fluid out of the interior of the cylinder 51 can be suppressed.

Fourth Embodiment

Figure 18:
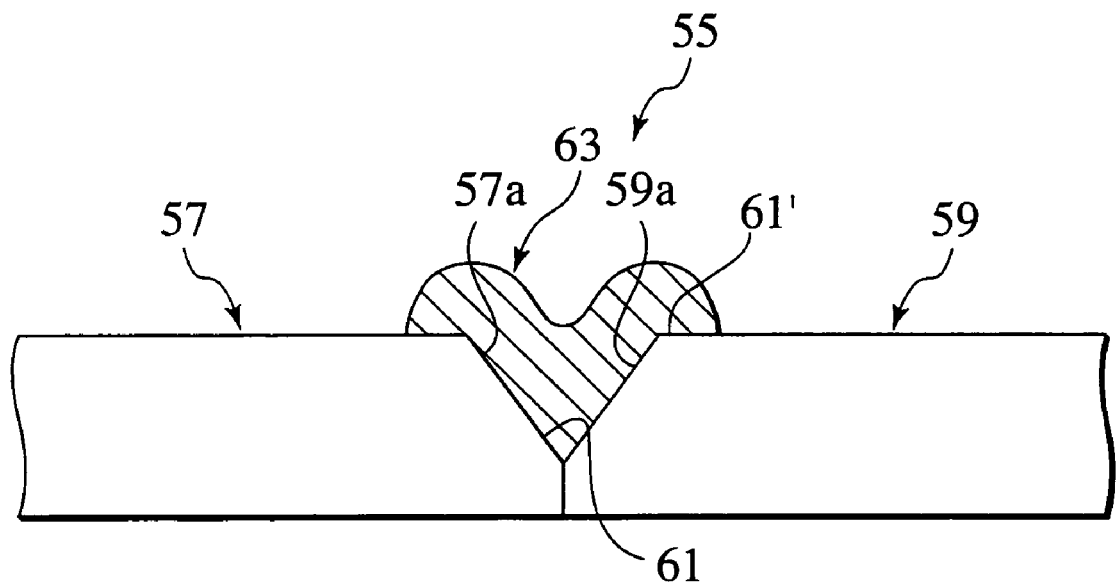
[FIG. 18] A partial cross sectional view of a joint structure in accordance with a fourth embodiment.

A joint structure 55 in accordance with a fourth embodiment will be described hereinafter with reference to FIG. 18.

The joint structure 55 is provided with a pair of metal components 57, 59 which are butted with each other and, in this condition, joined with each other and the pair of the metal component 57, 59 are respectively provided with beveling portions 57a, 57b. Moreover, a recess portion 61 is defined by the beveling portion 57a of the metal component 57 and the beveling portion 59a of the other metal component 59 and a deposition 63 is formed at a recess portion periphery 61' including the recess portion 61 by energy of the electric discharge. Further, the deposition 63 is gradually formed by employing the molded electrode 27 shown in FIG. 1, generating a pulsing electric discharge between the recess portion periphery 61' including the recess portion 61 and the molded electrode 27 in an electrically insulating liquid or gas so that a material of the molded electrode 27 or a reaction substance of the material carries out deposition, diffusion and/or welding at the recess portion periphery 61' by energy of the electric discharge.

Here, the molded electrode 27 is composed of a molded body molded from powder of a material having the same composition as the metal components 57, 59, powder of a material having the similar composition to the metal components 57, 59, or powder of a material having a coefficient of thermal expansion close to a coefficient of thermal expansion of a base material of the metal component 57, 59 by means of compression by pressing; or the molded body subject to a heat treatment by a vacuum furnace or such.

Meanwhile, in a case where the base material of the metal component 57, 59 is a stainless alloy of iron including 18% of chromium and 8% of nickel, another stainless steels having different contents become the material having the similar composition and cobalt or cobalt alloys become the material having the coefficient of the thermal expansion close thereto. Moreover, instead of molding by compressing, the molded electrode 27 may be formed by slurry pouring, MIM (Metal Injection Molding), spray forming and such.

Figure 19:
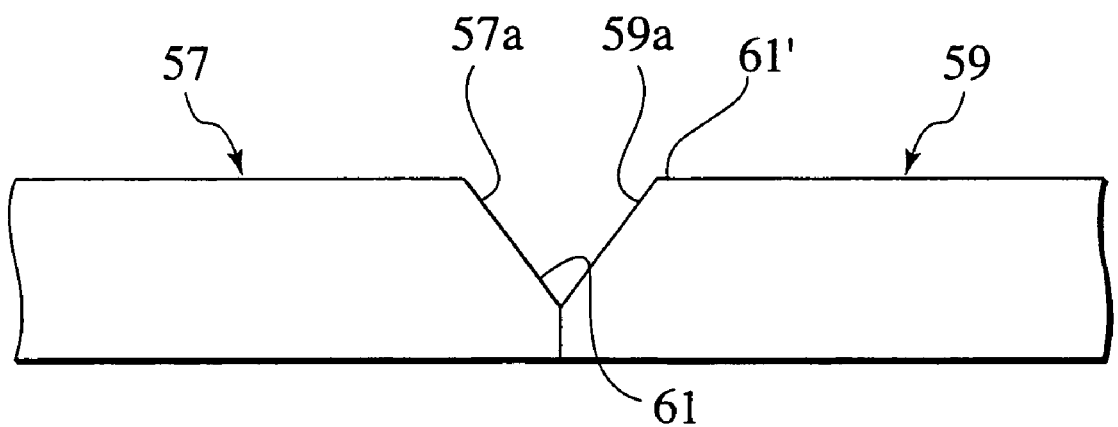
[FIG. 19] A drawing explaining a joining method of a metal product in accordance with the fourth embodiment.
Figure 20:
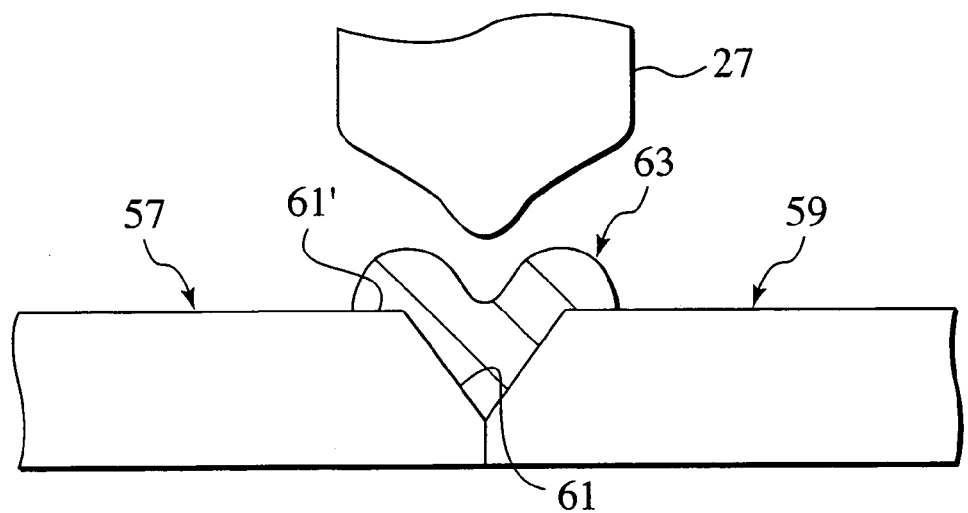
[FIG. 20] A drawing explaining a joining method of a metal product in accordance with the fourth embodiment.
Figure 21:
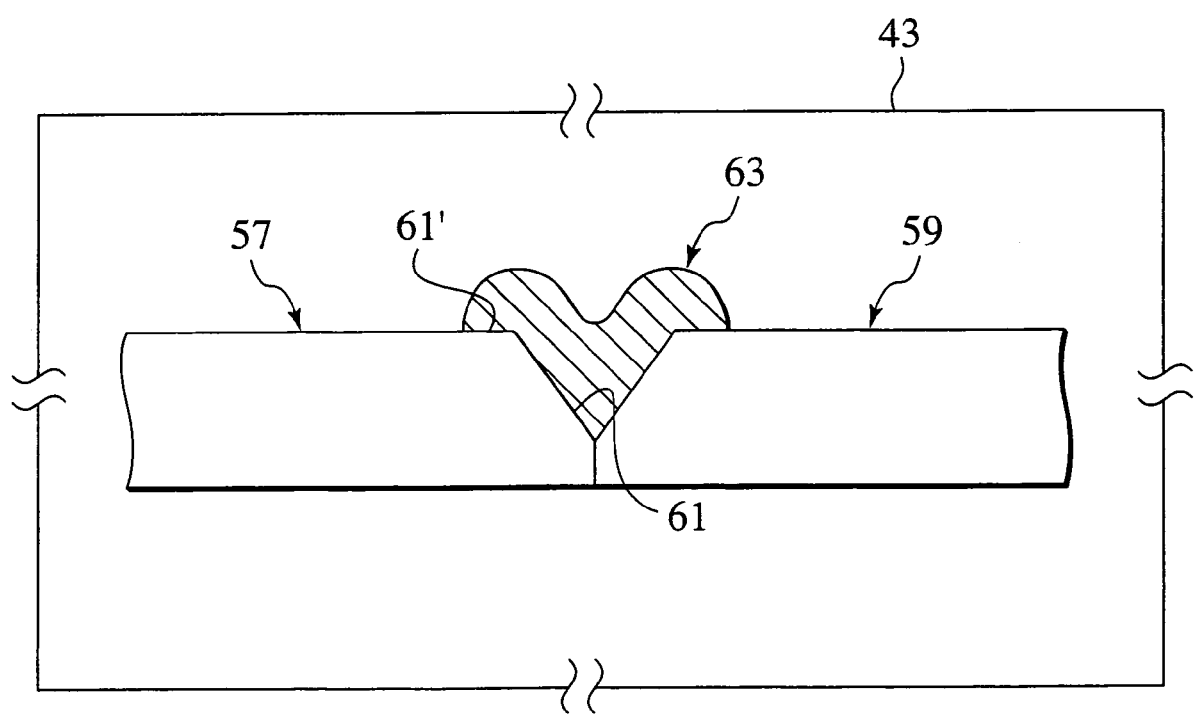
[FIG. 21] A drawing explaining a joining method of a metal product in accordance with the fourth embodiment.

Next, the production method of the joining method of the metal components in accordance with the fourth embodiment will be described hereinafter with reference to FIG. 1 and from FIG. 19 to FIG. 21.

The joining method of the metal components in accordance with the fourth embodiment is a method for joining the pair of the metal components 57, 59 and employing the electric spark machine 1, the molded electrode 27 and the heat treatment furnace 43 as described above. Further, the joining method of the metal components in accordance with the fourth embodiment is provided with a (4-1) butting step, a (4-2) deposition step, and a (4-3) heat treatment step as described below.

(4-1) Butting Step

The pair of the metal components 57, 59 are set to the jig 17 so that the pair of the metal components 57, 59 are butted with each other. Thereby, the recess portion 61 is defined by the beveling portion 57a of the metal component 57 and the beveling portion 59a of the other metal component 59 as shown in FIG. 19.

(4-2) Deposition Step

After finishing the (4-1) butting step, by means of driving the X-axis servo-motor 9 and the Y-axis servo-motor 11, the table 7 is moved in the X-axis direction and the Y-axis direction to position the pair of the metal components 57, 59 so that the recess portion periphery 61' is opposite to the molded electrode 27. Meanwhile, there may be a case where the table 7 is only necessary to be moved in any of the X-axis direction and the Y-axis direction.

Further, a pulsing electric discharge is generated between the recess portion periphery 61' and the molded electrode 27 in an electrically insulating liquid S. Thereby, as shown in FIG. 20, by means of energy of the electric discharge, a material of the molded electrode 27 or a reaction substance of the material carries out deposition, diffusion and/or welding at the recess portion periphery 61' and thereby a deposition 63 can be gradually formed at the recess portion periphery 61'. Meanwhile, when generating the pulsing discharge, the molded electrode 27, as being integral with the processing head 21, is reciprocated in the Z-axis direction by a small travel distance by means of a drive of the Z-axis servo-motor 23.

Here, dimensions of the deposition 63 are made to be greater than dimensions of the recess portion 61. In concrete terms, an outer periphery of the deposition 63 is made to spread outward in 0.5 mm or more relative to an outer periphery of the recess portion 61 and a thickness of the deposition 63 is made to be thicker in 0.3 mm or more than a thickness required to filling the recess portion 61. Thereby diffusion bonding among particles at the interior of the deposition 63 can be generated.

(4-3) Heat Treatment Step

After finishing the (4-2) deposition step, the pair of the metal components 57, 59 are removed from the jig 17 and set at a predetermined position of the heat treatment furnace 43.

Further, the deposition 63 accompanying the pair of the metal components 57, 59 is kept at a high temperature in a vacuum or in the air by means of the heat treatment furnace 43. Thereby, a heat treatment can be processed with respect to the deposition 63 so as to progress diffusion bonding among the particles at the interior of the deposition 63 and joining of the pair of the metal components 57, 59 is finished.

Here, the temperature and the period of time are 20 minutes at a high temperature of 1050 degrees C. and subsequently 4 hours at a high temperature of 760 degrees C. in a case where the deposition 63 is composed of a nickel alloy or a cobalt alloy.

Meanwhile, the joining method of the metal components in accordance with the aforementioned fourth embodiment may be modified as in the following embodiment.

More specifically, the (4-3) heat treatment step can be omitted from the series of the steps in the joining method of the metal components in accordance with the fourth embodiment.

Moreover, between the (4-2) deposition step and the (4-3) heat treatment step, an excessive deposition may be removed.

Furthermore, instead of generating the pulsing discharge in the electrically insulating liquid S, a pulsing discharge may be generated in an electrically insulating gas.

Next, operations of the fourth embodiment will be described.

Because energy of the electric discharge locally acts on a prominently small part and the deposition 63 is gradually formed by carrying out deposition, diffusion and/or welding of the material of the molded electrode 27 or such, a temperature of the recess portion periphery 61' in the metal components 57, 59 is prevented from rapidly increasing at a time of joining the pair of the metal components 57, 59.

Moreover, because the deposition 63 is formed by means of the energy of the electric discharge, a boundary part between the deposition 63 and a base material of the metal components 57, 59 has a structure in which a composition ratio grades and hence the deposition 63 can be firmly combined with the metal components 57, 59.

Furthermore, because the diffusion boding among the particles at the interior of the deposition 63 progresses, a tensile strength of the deposition 63 can be increased.

In accordance with the fourth embodiment as described above, because the temperature of the recess portion periphery 61' in the metal components 57, 59 is prevented from rapidly increasing at the time of joining the pair of the metal components 57, 59, thermal deformation of the recess portion periphery 61' is sufficiently suppressed and hence defective joining of the pair of the metal components is reduced to be almost none.

Moreover, because the deposition 63 can be firmly combined with the metal components 57, 59 and the tensile strength of the deposition 63 can be increased, the condition of the joint between the pair of the metal components 57, 59 comes to be firm, in other words, a mechanical strength of the joint structure 55 can be increased.

As described above, the invention has been described above by reference to several preferable embodiments, however, the scope and the right of the appended claims should not be limited to these embodiments.

Moreover, the contents of Japanese Patent Applications No. 2003-167025 and No. 2003-167074, both filed with the Japan Patent Office on Jun. 11, 2003, are incorporated herein by reference in their entirety.

The invention claimed is:

1. A method for production of a metal product, comprising:
   molding a main body of a metal;
   removing a portion defining a defect included in the main body to form a recess portion; depositing a deposition from a deposition tool electrode to fill the recess portion by processing the main body as a workpiece of an electric spark machine opposed to the
   deposition tool electrode; and
   eliminating a projecting portion of the deposition by a pulsing electronic discharge between the projecting portion of the deposition and a hard electrode in an electrically insulating liquid or an electrically insulating gas.

2. The method of claim 1, wherein the removing is carried out by processing the defect as a workpiece of the electric spark machine opposed to the hard electrode.

3. The method of claim 1, further comprising:
   melting the deposition in part to form a thin film from the melted deposition by processing the deposition as a workpiece of the electric spark machine opposed to the hard electrode; and
   forming a second deposition from the deposition electrode on the thin film and the deposition by processing the deposition as a workpiece of the electric spark machine opposed to the deposition tool electrode.

4. The method of claim 3, further comprising:
   treating the deposition, the thin film, and the second deposition with a heat treatment.

5. The method of claim 1, wherein the eliminating is carried out by processing the projecting portion as a workpiece of the electric spark machine opposed to the hard electrode.

6. The method of claim 1, further comprising:
   melting the deposition in part to form a thin film from the melted deposition by processing the deposition as a workpiece of the electric spark machine opposed to the hard electrode,
   wherein the depositing and melting are reciprocally carried out.

7. The method of claim 6, further comprising:
   treating the deposition and the thin film with a heat treatment.

8. The method of claim 1, wherein the deposition tool electrode is formed by compressing a powder consisting essentially of the metal.

9. The method of claim 1, wherein the hard electrode consists essentially of an exhaustion-resistive material selected from a group consisting of graphite, tungsten alloys, or copper alloys.

10. The method of claim 1, wherein the molding includes casting the main body and the defect includes a casting cavity.

11. The method of claim 1, wherein the depositing includes a pulsing electric discharge from the deposition tool electrode and is carried out in the electrically insulating liquid or the electrically insulating gas.

12. The method of claim 1, wherein the depositing includes reciprocating the deposition tool electrode towards and away from the main body.

13. The method of claim 1, wherein the eliminating includes reciprocating the hard electrode towards and away from the projecting portion.

* * * * *